(12) United States Patent
Shayandeh et al.

(10) Patent No.: US 9,756,438 B2
(45) Date of Patent: Sep. 5, 2017

(54) PROXIMITY DISCOVERY USING AUDIO SIGNALS

(71) Applicant: Microsoft Corporation, Redmond, WA (US)

(72) Inventors: Shahin Shayandeh, Kirkland, WA (US); Steven Ickman, Snoqualmie, WA (US); William Portnoy, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 14/313,201

(22) Filed: Jun. 24, 2014

(65) Prior Publication Data

US 2015/0373468 A1 Dec. 24, 2015

(51) Int. Cl.
  *H04R 29/00* (2006.01)
  *G01S 5/18* (2006.01)
  *G01S 5/02* (2010.01)

(52) U.S. Cl.
  CPC .............. *H04R 29/00* (2013.01); *G01S 5/18* (2013.01); *G01S 5/0252* (2013.01)

(58) Field of Classification Search
  None
  See application file for complete search history.

(56) References Cited

U.S. PATENT DOCUMENTS

| | | | |
|---|---|---|---|
| 7,383,297 | B1 | 6/2008 | Atsmon et al. |
| 7,443,807 | B2 | 10/2008 | Cutler |
| 2011/0067075 | A1 | 3/2011 | Barry |
| 2011/0307599 | A1 | 12/2011 | Saretto et al. |
| 2012/0214515 | A1 | 8/2012 | Davis et al. |
| 2012/0253819 | A1 | 10/2012 | Hasegawa et al. |
| 2012/0263020 | A1 | 10/2012 | Taylor et al. |
| 2013/0024576 | A1 | 1/2013 | Dishneau et al. |
| 2013/0130714 | A1 | 5/2013 | Huibers et al. |
| 2013/0171930 | A1 | 7/2013 | Anand et al. |

FOREIGN PATENT DOCUMENTS

WO 2012126823 A1 9/2012

OTHER PUBLICATIONS

"Response to the International Search Report & Written Opinion Issued in PCT Application No. PCT/US2015/036855", Filed Date: Dec. 30, 2015, 18 Pages.

(Continued)

*Primary Examiner* — Paul Huber
(74) *Attorney, Agent, or Firm* — Medley, Behrens & Lewis, LLC

(57) ABSTRACT

Various technologies pertaining to computing data that is indicative of a location of a client computing device are described herein. A client computing device is configured to capture an audio signal, the audio signature being indicative of acoustics of surroundings of the client computing device. A signature is generated based upon a high frequency portion of the captured audio signal, and the signature is compared with other signatures. The other signatures are generated based upon high frequency portions of audio signals captured by other computing devices. A determination regarding the client computing device being co-located with a second client computing device is made based upon the comparison of the signature with the other signatures.

20 Claims, 10 Drawing Sheets

(56) References Cited

OTHER PUBLICATIONS

"International Search Report & Written Opinion Issued in PCT Application No. PCT/US2015/036855", Mailed Date: Sep. 16, 2015, 11 Pages.

"Written Opinion of the International Preliminary Examining Authority Issued in PCT Application No. PCT/US2015/036855", Mailed Date: May 23, 2016, 7 Pages.

"International Preliminary Report on Patentability Issued in PCT Application No. PCT/US2015/036855", Mailed Date: Sep. 26, 2016, 8 Pages.

PROXIMITY DISCOVERY USING AUDIO SIGNALS

BACKGROUND

Mobile computing devices are now typically equipped with positional sensors therein, such as global positioning system (GPS) sensors. A GPS sensor computes its location based upon detected signals emitted by orbiting satellites. It can, therefore, be ascertained that when a mobile computing device is indoors, the GPS sensor may be unable to accurately compute the location of the mobile computing device.

SUMMARY

The following is a brief summary of subject matter that is described in greater detail herein. This summary is not intended to be limiting as to the scope of the claims.

A computing system is described herein. The computing system comprises a processor and a memory, the memory comprises a location system that is executed by the processor. The location system is configured to compute data that is indicative of a location of a client computing device based upon an audio-based signature of surroundings of the client computing device, the audio-based signature is based upon a high frequency portion of an audio signal captured by the client computing device. The location system is further configured to provide the client computing device with the data that is indicative of the location of the client computing device.

DETAILED DESCRIPTION

Figure 1:
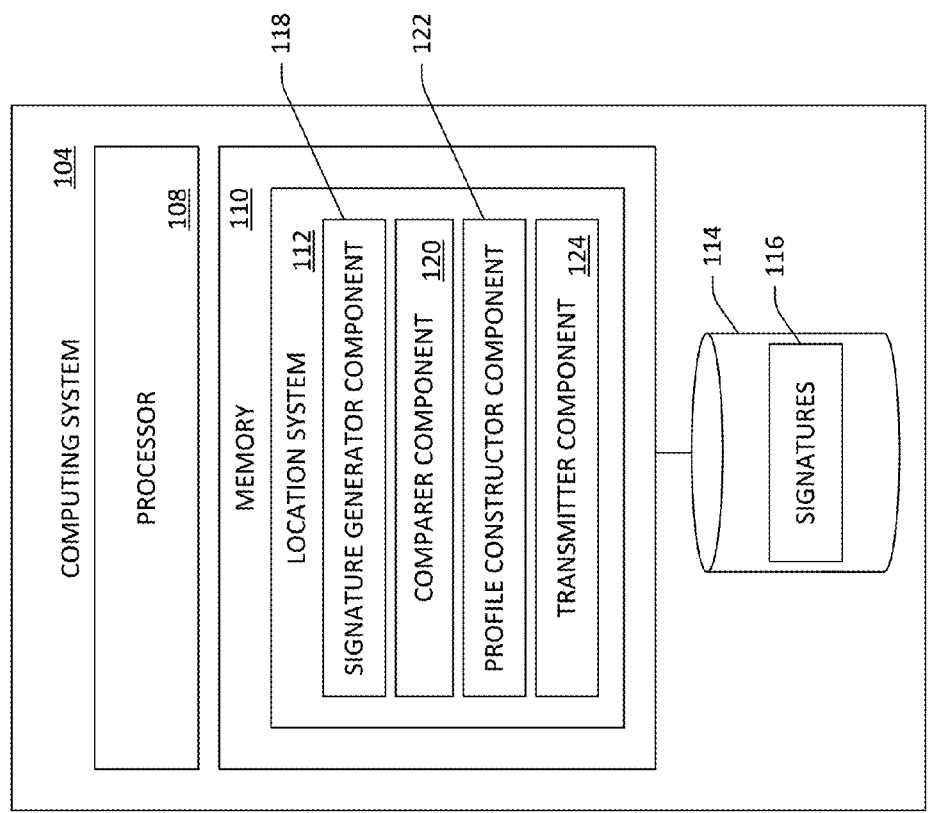
FIG. 1 is a functional block diagram of an exemplary computing system that is configured to compute location data for a client computing device.
Figure 1:
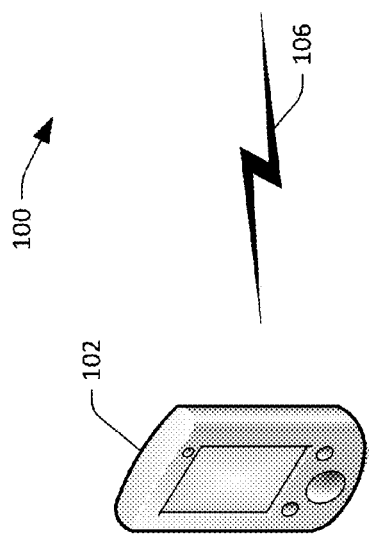

Various technologies pertaining to computing information pertaining to location of client computing devices based upon audio signals captured by the client computing devices are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary system 100 that facilitates computing data that is indicative of a location of a client computing device 102 is illustrated. The data that is indicative of the location of the client computing device 102, as will be described in greater detail herein, may be an absolute location (e.g., a particular room, in a certain building, etc.). In another example, the data that is indicative of the location of the client computing device 102 may be a relative location. For example, the data that is indicative of the location of the client computing device 102 can note that the client computing device 102 is co-located in a room with another client computing device. The client computing device 102 may be a mobile telephone, a tablet computing device, a laptop computing device, a wearable computing device (such as a watch, glasses, or the like), etc.

The system 100 further includes a computing system 104 that is in communication with the client computing device 102 by way of a communications link 106. The computing system 104 may be a computing device or a distributed computing system. For example, the computing system 104 may be or may be included in an enterprise computing system, a data center, etc. In another example, the computing system 104 may be included in the mobile computing device 102.

The computing system 104 includes a processor 108 and a memory 110, wherein the memory 110 comprises a location system 112 that can be executed by the processor 108. Generally, the location system 112 is configured to receive data generated by the mobile computing device 102 (e.g., over the communications link 106) and compute the data that is indicative of the location of the mobile computing device 102 based upon the received data. The location system 112 is particularly well-suited for computing data that is indicative of the location of the mobile computing device 102 when the mobile computing device 102 is indoors.

The computing system 104 additionally includes a data store 114 that comprises a plurality of signatures 116. In an example, the signatures 116 can be respectively representative of several rooms. Thus, a signature in the signatures 116 can include a data structure that is indicative of the features of a room, and therefore can be employed to identify the room. For instance, the signatures 116 can be audio-based signatures of respective rooms. The signatures 116 can be based upon audio signals captured by microphones of client computing devices in the rooms. For example, the signatures 116 can be based upon high-frequency portions of audio signals captured by client computing devices in several rooms. A high-frequency portion of an audio signal may be, for example, frequencies of the audio signal above 18 kHz. In another example, a high-frequency portion of an audio signal can be frequencies of the audio signal above 20 kHz. In yet another example, the high-frequency portion of an audio signal may be frequencies of the audio signal above 25 kHz. An upper end of the frequency range of the audio signal can be limited by the microphones utilized to capture the audio signal. Thus, for instance, the high-frequency portion of an audio signal captured by a microphone of the client computing device 102 may be between 18 kHz and 80 kHz, between 20 kHz and 50 kHz, etc. In an example, hashes of high frequency portions of audio signals captured in a room within some range of time (e.g., ten seconds, one minute, ten minutes, two hours) have been found to be consistent with respect to one another, particularly when compared to the low-frequency portion of the audio signal (e.g., the portion of the audio signal audible to the human ear). This consistency between hashes allows for the hashes to be used to construct audio-based profiles of rooms, and further allows for hashes to be compared to ascertain if two devices are co-located. In a non-limiting example, the signatures 116 can be respective hashes of high-frequency portions of audio signals captured by client computing devices in rooms. Furthermore, the signatures 116 can have respective identifiers associated therewith, where the identifiers identify the client computing devices that capture the audio signals upon which the signatures 116 are based.

The location system 112 optionally includes a signature generator component 118 that is configured to receive at least high-frequency portions of audio signals captured by client computing devices and generate signatures based upon such high-frequency portions. Pursuant to an example, the signature generator component 118 can execute a hash algorithm over high-frequency portions of audio signals captured by client computing devices in rooms, wherein resultant hashes are included in the signatures.

The location system 112 can further include a comparer component 120 that compares a signature that is based upon an audio signal captured by a client computing device (e.g., the client computing device 102) with signatures 116 in the data store 114. The location system 112 further includes a profile constructor component 122 that can construct profiles of rooms based upon high-frequency portions of audio signals captured by client computing devices in the rooms. In an example, the profile constructor component 122 can generate time-varying profiles of rooms that represent high-frequency acoustics of the rooms over time. For instance, a room may be represented by a first signature at a first time (e.g., when an air-conditioning unit is running) and may be represented by a second high-frequency signature at a second time (e.g., when the air-conditioning unit is not running). The location system 112 further includes a transmitter component 124 that is configured to transmit data that is indicative of a determined location (absolute or relative) of a client computing device to the client computing device.

Operation of the system 100 will now be described with reference to the client computing device 102. The client computing device 102 may be located in a room, and it may be desirable for the client computing device 102 to ascertain which room the client computing device 102 is located in and/or to ascertain if any other client computing devices are co-located with the client computing device 102 in the room. Accordingly, the client computing device 102 can capture an audio clip of the room. Length of the audio clip may be one half of a second, one second, three seconds, six seconds, eight seconds, and so on. In an example, the client computing device 102 can apply a high-pass filter over the captured audio clip, thereby removing low-frequency portions from the audio clip. The remainder, then, is a high-frequency portion of the audio clip. The client computing device 102 may optionally compress the high-frequency portion of the audio clip and transmit the compressed high-frequency portion of the audio clip to the computing system 104 over the communications link 106. In another example, the client computing device 102 can compress the entirety of the audio clip and transmit the compressed audio clip to the computing system 104, which can then perform the above-described filtering. Still further, the client computing device 102 can transmit the uncompressed audio clip to the computing system 104.

In an example, the location system 112 receives the compressed high-frequency portion of the audio clip and executes a decompression algorithm thereover, such that the high-frequency portion of the audio clip captured by the client computing device 102 is obtained. The signature generator component 118 then generates an audio-based signature of the room in which the client computing device 102 resides based upon the high-frequency portion of the audio clip captured by the client computing device 102. As indicated previously, the signature generator component 118 can execute a hash algorithm over the high-frequency portion of the audio clip, thereby generating an audio-based signature of the room. Additionally, the signature generator component 118 can cause an identity of the client computing device 102 (or a user thereof) to be included in the signature or otherwise associated with the signature (e.g., appended to the signature).

The comparer component 120 can then compare the signature generated by the signature generator component 118 with the signatures 116 in the data store 114. The signatures 116 in the data store 114 can have identities of rooms that are represented by the signatures 116 associated therewith. Additionally or alternatively, the signatures 116 can have identities of client computing devices that captured audio signals upon which the signatures 116 are based. Pursuant to an example, the comparer component 120 include a classifier that has been trained to map a received signature to a room location, as identified in the signatures 116 in the data store 114. In another example, the comparer component 120 can perform a pairwise comparison between the signature generated by the signature generator component 118 and each signature in the signatures 116. The comparer component 120 can utilize a distance-based algorithm to obtain a distance value that is indicative of similarity between two signatures when performing the pairwise comparison. The comparer component 120 can output a match to the signature generated by the signature generator component 118 when the distance value between the signature and the matching signature is below a predefined threshold. In this case then, the signature generated by the signature generator component 118 can be found to be matching more than one signature in the signatures 116. Such approach may be particularly well-suited when it is desirable to ascertain identities of client computing devices that are co-located in the room with the client computing device 102. Again, however, it is to be understood that any suitable technique for mapping the signature generated by the signature generator component 118 to an identity of a room.

In another example, the comparer component 120 can search for a single matching signature in the signatures 116. The comparer component 120 can determine that a signature in the signatures 116 matches the signature generated by the signature generator component 118 when: 1) the distance value between the signature generated by the signature generator component 118 and the matching signature is the lowest amongst all distance values; and 2) the distance value is below a predefined threshold. This approach may be particularly well-suited when it is desirable to identify a room in which the client computing device 102 is located. In another exemplary embodiment, the comparer component 120 can compare the signature generated by the signature generator component 118 with the signatures 116 in the data store 114 through use of a clustering algorithm. In such a case, the comparer component 120 can output signatures in the same cluster with the signature generated by the signature generator component 118 as matching signatures.

The profile constructor component 122 can optionally create or update a profile of the room based upon the signature generated by the signature generator component 118. For instance, once the room is identified (e.g., based upon the comparison performed by the comparer component 120), the profile constructor component 122 can create or update the profile of the room. Thus, for example, the profile constructor component 122 can reduce uncertainty in a profile of the above-mentioned room based upon the signature generated by the signature generator component 118. Further, as the profile may be time-varying, a timestamp assigned to the signature can be employed to update the profile.

The transmitter component 124, responsive to the comparer component 120 identifying at least one signature in the signatures 116 that corresponds to (e.g., is sufficiently similar to) the signature generated by the signature generator component 118, can transmit data that is indicative of the computed location of the client computing device 102 to the client computing device 102 (and optionally to other client computing devices that are co-located with the client computing device 102). The data transmitted to the client computing device 102 may be data that identifies the room in which the client computing device 102 is located. In another example, the data transmitted to the client computing device may be data that identifies other client computing devices that are co-located with the client computing device 102 in the MOM.

The client computing device 102 may utilize this data that is indicative of the location of the client computing device 102 in a variety of manners. For instance, the client computing device 102 can present a map of an environment to the user of the client computing device 102. In another example, the client computing device 102 can execute a content sharing application responsive to receiving identities of other client computing devices that are co-located with the client computing device 102. For instance, the client computing device 102 can cause content to be displayed on other client computing devices that are co-located in the room with the client computing device 102. In another example, the client computing device 102 can be provided access to a shared file space with other client computing devices in the room with the client computing device 102. In still yet another example, electronic communication data, such as advertisements, can be pushed to the client computing device 102 based upon an identity of the room in which the client computing device 102 is located. Other examples are also contemplated.

It can be ascertained that in some situations the location system 112 may not be able to ascertain with sufficient certainty as to, for example, whether the client computing device 102 is co-located with another client computing device. For instance, a distance value between the signature generated by signature generator component 118 and a signature in the signatures 116 generated by a second client computing device (where the signatures were generated proximate in time to one another) may be above a threshold, but still somewhat similar. To reduce ambiguity as to whether the client computing device 102 and the second client computing device are co-located in the same room, the transmitter component 124 can transmit a request to the client computing device 102 (and the second client computing device) for additional information. This additional information can include, but is not limited to, an identity of an access point through which the client computing device 102 is communicating (e.g., a Wi-Fi access point, a cellular tower, a Bluetooth emitter, etc.).

In another example, the transmitter component 124 can transmit a signal to the client computing device 102 that causes the client computing device 102 to emit an audio signal with an identifier encoded therein, wherein the identifier identifies the client computing device 102 and/or the user thereof. In an example, the audio signal may be a high frequency audio signal. In another example, the audio signal may include a high frequency portion and a low frequency portion (e.g., 20 Hz), wherein the low frequency portion is also inaudible to the human ear. Likewise, the transmitter component 124 can cause the second client computing device in the room to transmit an inaudible audio signal that has the identity of the second client computing device or a user thereof encoded therein. A microphone of the client computing device 102 can capture the inaudible audio signal, and the client computing device 102 can compress the signal and transmit the compressed signal to the computing system 104. The location system 112 can decompress this audio signal and can search for an identifier encoded therein. In this case, the comparer component 120 can compare the identifier extracted from the audio signal to a known identifier of the second client computing device (or its user). When the comparer component 120 determines that the identifier encoded in the audio signal and the known identifier match, the comparer component 120 can reduce the ambiguity about whether the client computing device 102 and the second client computing device are co-located in the room. For example, when the client computing device 102 captures an audio signal that comprises an identifier of the second client computing device encoded therein, it can be determined with reasonable certainty that the client computing device 102 and the second client computing device are co-located with one another.

While FIG. 1 illustrates an exemplary set up of the system 100, it is to be understood that other arrangements are contemplated. For example, rather than the client computing device 102 transmitting a compressed audio signal to the computing system 104, the client computing device 102 may include the signature generator component 118. Accordingly, the client computing device 102 can transmit the signature to the computing system 104, which can then perform the comparing described above. Likewise, rather than the client computing device 102 transmitting the high-frequency audio signal that includes an identity encoded therein to the computing system 104, the client computing device 102 can be configured to analyze the high-frequency audio signal and extract the identity therein. The client computing device 102 may then transmit the extracted identity to the computing system 104, which can perform the comparison described above. Other alternatives are also contemplated.

Figure 2:
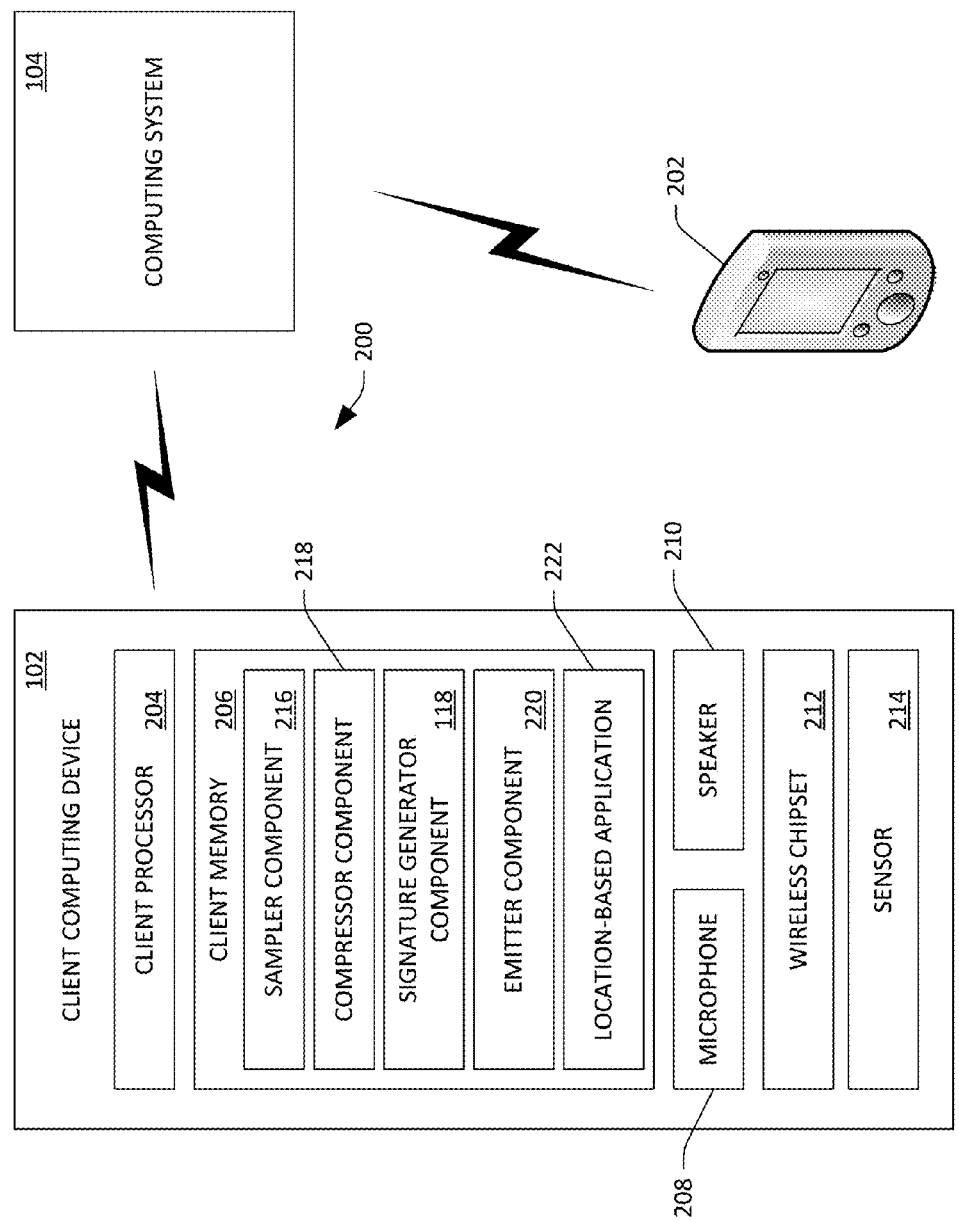
FIG. 2 is a functional block diagram of an exemplary system that facilitates determining that two or more client computing devices are co-located in a room.

With reference now to FIG. 2, another exemplary system 200 that is configured to compute data that is indicative of a location of the client computing device 102 is illustrated. The system 200 includes the client computing device 102, the computing system 104, and a second client computing device 202. While the second client computing device 202 is illustrated as being a mobile telephone, it is to be understood that the second client computing device 202 may be a stationary device, such as a desktop computing device, a video game console, a television, a set top box, etc. Further, the second client computing device 202 may be a mobile device, such as a mobile telephone, a tablet computing device, a laptop computing device, a wearable, or the like. As shown, the client computing device 102 is in communication with the computing system 104, and the second client computing device 202 is also in communication with the computing system 104.

The client computing device 102 includes a client processor 204 and a client memory 206, wherein the client memory 206 includes components and an application that are executable by the client processor 204. Such components and application will be discussed below.

The client computing device 102 further includes a microphone 208 that is configured to capture audio signals. For instance, the microphone 208 can be configured to capture audio signals having both a low-frequency portion (audible to the human ear) and a high-frequency portion (inaudible to the human ear). The client computing device 102 further includes a speaker 210 that can emit audio signals. Pursuant to an example, the speaker 210 can be capable of emitting a high-frequency audio signal.

The client computing device 102 also includes a wireless chipset 212 that is configured to form wireless communications links with other devices. For example, the wireless chipset 212 may be a Wi-Fi chipset, a Bluetooth chipset, an optical communications chipset, or the like. Still further, the client computing device 102 can include a sensor 214. The sensor 214 may be a GPS sensor, accelerometer, a velocity sensor, a gyroscope, a barometer, a thermometer, or the like.

The components and application in the client memory 206 will now be discussed. The client memory 206 includes a sampler component 216 that is configured to cause the microphone 208 of the client computing device 102 to capture an audio clip. The sampler component 216 may also be configured to apply a high-pass filter over audio signals captured by the microphone 208 of the client computing device 102.

The client memory 206 optionally includes a compressor component 218 that is configured to compress at least high frequency portions of audio signals captured by the microphone 208. The client memory 206 can further optionally include the signature generator component 118, which can generate an audio-based signature based upon the high-frequency portion of the audio signal captured by the microphone 208. An emitter component 220 can be configured to emit the compressed high-frequency portion of the audio signal to the computing system 104. Alternatively, the emitter component 220 can be configured to emit the signature generated by the signature generator component 118 to the computing system 104. In still yet another example, the emitter component 220 can be configured to control operation of the speaker 210. For example, the emitter component 220 can cause the speaker 210 to output a high-frequency audio signal with an identifier of the client computing device 102 (or the user thereof) encoded therein. The data that identifies the client computing device 102 can be known to the computing system 104. For example, the computing system 104 can transmit instructions to the client computing device 102, wherein the instructions cause the emitter component 220 to control the speaker 210 to output the high-frequency audio signal.

The client memory 206 may further include a location-based application 222, which can perform at least one operation based upon data that is indicative of location computed by the computing system 104. Exemplary operations have been described above with respect to FIG. 1.

Operation of the system 200 is now set forth. The client computing device 102 may be in an indoor environment, and it may be desirable to identify other client computing devices co-located in the room with the client computing device 102. As shown in FIG. 2, the second client computing device 202 is co-located in the room with the client computing device 102. The sampler component 216 can control the microphone 208 to capture an audio signal, the audio signal including acoustic information about the surroundings of the client computing device 102. Further, the sampler component 216 can filter out the low-frequency portion of the audio signal, thereby generating a high-frequency portion of the audio signal.

The compressor component 218 optionally can compress the high-frequency portion of the audio signal and cause the compressed high-frequency portion of the audio signal to be transmitted to the computing system 104. Alternatively, the signature generator component 118 can receive the high-frequency portion of the audio signal and can generate an audio-based signature based upon the high-frequency portion of the audio signal. The signature generator component 118 can then cause the signature to be transmitted the computing system 104.

Meanwhile, the second client computing device 202 can include instances of the sampler component 216, the compressor component 218, the signature generator component 118, and the emitter component 220, respectively. Accordingly, the second client computing device 202, at a similar point in time (e.g. within a threshold amount of time from when the microphone 208 captures the audio signal at the client computing device 102), can capture an audio signal, and a signature based upon such audio signal can be generated (at the second client computing device 102 or the computing system 104). As described above, the computing system 104 can compare the signatures that were generated based upon audio signals captured by the client computing device 102 and the second client computing device 202.

In this example, the computing system 104 can determine that such signatures are sufficiently similar to one another to indicate that the client computing device 102 and the second client computing device 202 are co-located in the same room. This determination can be made based partially upon timestamps assigned to such signatures, wherein a time between the timestamps is below a predefined threshold (e.g., 1 min., 2 min., 5 min., etc.). The computing system 104 may then transmit signals to the client computing device 102 and/or the second client computing device 202 that indicates to the computing devices 102 and/or 202 that they are co-located in the same room. This can initiate the location-based application 222, which can be configured to allow for content sharing between the computing devices 102 and 202 when such computing devices 102 and 202 are known to be in the same room. For instance, the location-based application 222 can cause content shown on a display of the client computing device 102 to simultaneously be displayed on the display of the client computing device 202.

When the computing system 104 is unable to ascertain with sufficient certainty that the client computing device 102 and the second client computing device 202 are co-located in the same room, the computing system 104 can transmit instructions to the client computing device 102 and/or the second client computing device 202 to obtain additional information about their surroundings. In an example, the computing system 104 can transmit instructions to the client computing device 102 that causes the speaker 210 to output a high-frequency audio signal, wherein the high-frequency audio signal has an identifier of the client computing device 102 encoded therein. The second client computing device 202 can, for example, listen (in the background) for high-frequency audio signals and can ascertain the identity of the first client computing device 102 encoded in the high-frequency audio signal. The second client computing device 202 may then transmit the identity of the client computing device 102 to the computing system 104, and the computing system 104 can determine that the client computing device 102 and the second client computing device 202 are co-located in the same room based upon the knowledge that the second client computing device 202 is proximate to the client computing device 102 (e.g., since the second client computing device 202 is able to ascertain the identity of the client computing device 102 encoded in the high-frequency audio signal).

Figure 3:
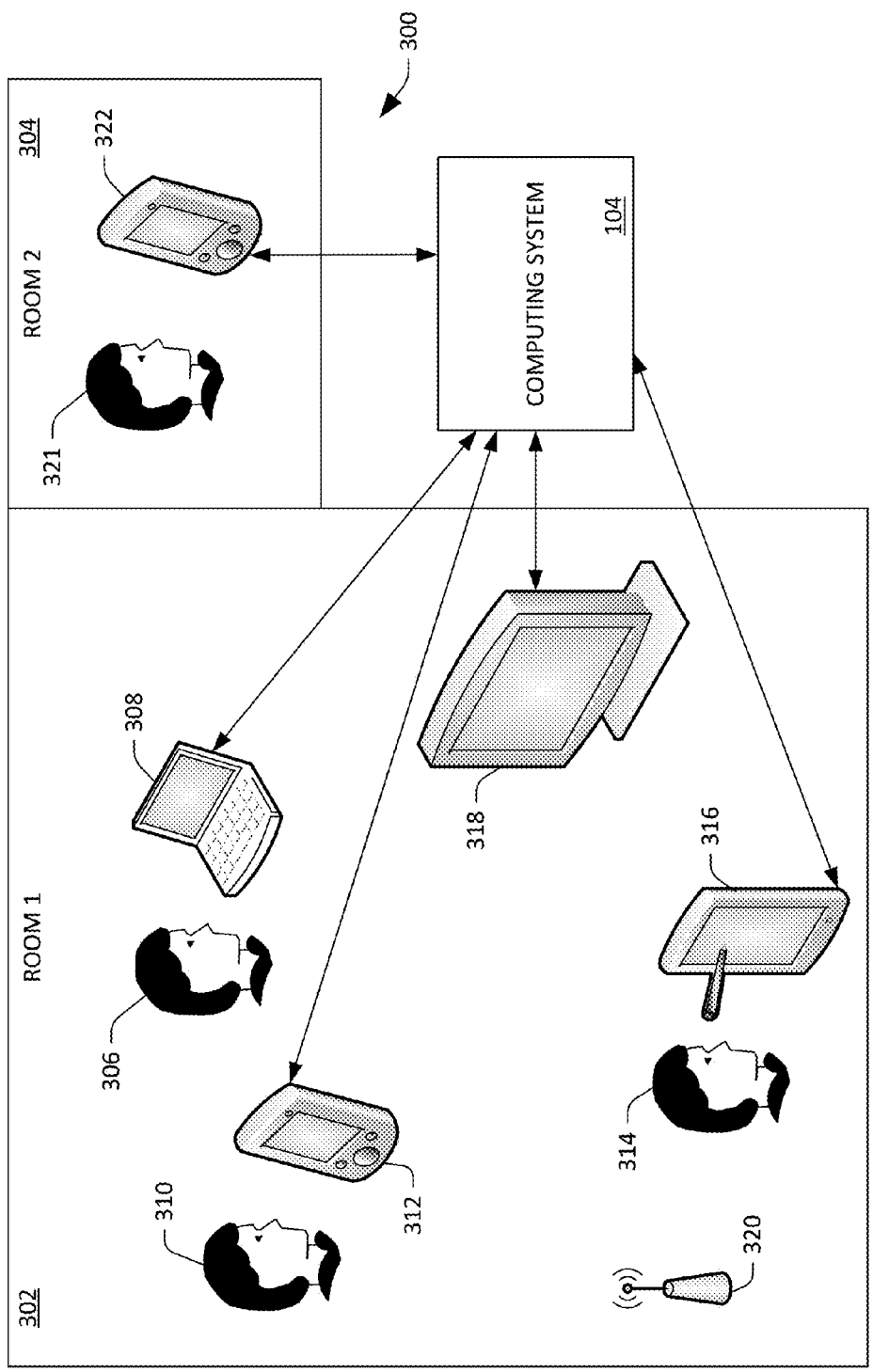
FIG. 3 illustrates a view of two rooms, wherein a computing system can ascertain which mobile computing devices are co-located in one of the rooms.

Now referring to FIG. 3, an exemplary environment 300 in which aspects described herein are particularly well-suited is illustrated. The environment 300 includes a first room 302 and a second room 304 (shown as being adjacent to the first room 302). In the first room 302, a meeting is being conducted. Specifically, in the first room 302 a first user 306 is employing a laptop computing device 308, a second user 310 is employing a mobile telephone 312, and a third user 314 is employing a tablet computing device 316. The first user 306, the second user 310, and the third user 314 may also be provided with content shown on a display 318 situated in the first room 302. For instance, the display 318 may be a television. The first room 302 also includes a wireless access point 320, which may be a wireless router.

The second room 304 includes a fourth user 321, who is using a mobile telephone 322. Thus, the fourth user 320 is not included in the meeting being conducted in the first room 302.

As described previously, high-frequency audio in the first room can act as an audio-based signature for the first room 302, while high-frequency audio in the second room 304 can act as an audio-based signature for the second room 304. For instance, different furniture in the first room 302 and the second room 304 may cause high-frequency audio observed in the rooms 302 and 304 to be different. Furthermore, sizes of the first room 302 and the second room 304 may cause high-frequency audio observed in such rooms to be different. Different hashes generated based upon high-frequency audio signals captured by different devices in the same room at temporally corresponding times have been found to be unique per room and similar to one another. This allows for the computing system 104 to differentiate which devices are co-located in the first room 302 and which device(s) are co-located in the second room 304.

In operation, the laptop computing device 308, the mobile telephone 312, the tablet computing device 316, and the display 318 (collectively referred to as "devices") can be configured to capture audio signals, and hashes of the high-frequency audio signals can be generated (e.g., by the devices 308, 312, 316, and 318 and/or the computing system 104). Similarly, the mobile telephone 322 in the second room 304 can be configured to capture an audio signal, and a hash of a high-frequency portion of the audio signal can generated (e.g., by the mobile telephone 322 or the computing system 104). The computing system 104 can receive these hashes and execute a clustering algorithm over such hashes. In this example, the resultant clusters will include: 1) a first cluster that comprises hashes based upon high-frequency portions of audio signals captured by the devices 308, 312, 316, and 318 in the first room 302; and 2) a second cluster that includes a hash generated based upon a high-frequency portion of an audio signal captured by the mobile telephone 322 in the second room 304. Thus, the computing system 104 can determine that the devices 308, 312, 316, and 318 are co-located with one another in the first room 302, and the computing system 104 can determine that the client computing device 322 is in a different room (e.g., is not co-located with the devices 308, 312, 316, and 318).

As described above, the devices 308, 312, 316, and 318, and the mobile telephone 322 may also transmit additional information about their respective surroundings to the computing system 104. For example, the devices 308, 312, 316, and 318 may be in communication with the access point 320, while the mobile telephone 322 in the second room 304 may be in communication with a different access point (not shown). The devices 308, 312, 316, and 318 can transmit an identity of the access point 320 to the computing system 104, which can utilize the identity of the access point 320 when clustering the hashes (e.g., when two or more of the computing devices report the same identity of the access point 320, the two reporting devices are likely to be in relative close proximity to one another).

Further, as indicated previously, one or more the devices 308, 312, 316, and 318 and/or the mobile telephone 322 may be caused to emit high-frequency audio signals that have respective device identities encoded therein. One or more of the devices 308, 312, 316, and 318 and/or the mobile telephone 322 may listen in the background for high-frequency audio signals, and can report detected identities to the computing system 104. For example, when the device 312 emits a high-frequency audio signal, the laptop computing device 308 may be configured to capture such audio signal and determine the identity of the device 312 encoded therein, while the device 322 in the second room 304 may be unable to acquire the high-frequency audio signal (due to a wall separating the rooms 302 and 304). The computing system 104 can be provided with this information from one or more of the devices 308, 312, 316, and 318 in the first room 302 and can ascertain which devices are co-located with one another in the first room 302.

Responsive to determining that the devices 308, 312, 316, and 318 are co-located with one another in the first room 302, the computing system 104 can cause a location-based application to be executed on at least one of the devices in the first room 302, such that, for example, content can be shared amongst the devices 308, 312, 316, and 318 (while the content may not be shared with the mobile telephone 322 in the second room 304). For example, the computing system 104 may cause content that corresponds to information shown the display 318 to be simultaneously presented on the displays of the computing devices 308, 312, and 316 (but not on the display of the mobile telephone 322).

FIGS. 4-10 illustrate exemplary methodologies relating to computing data that is indicative of a location of a client computing device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 4:
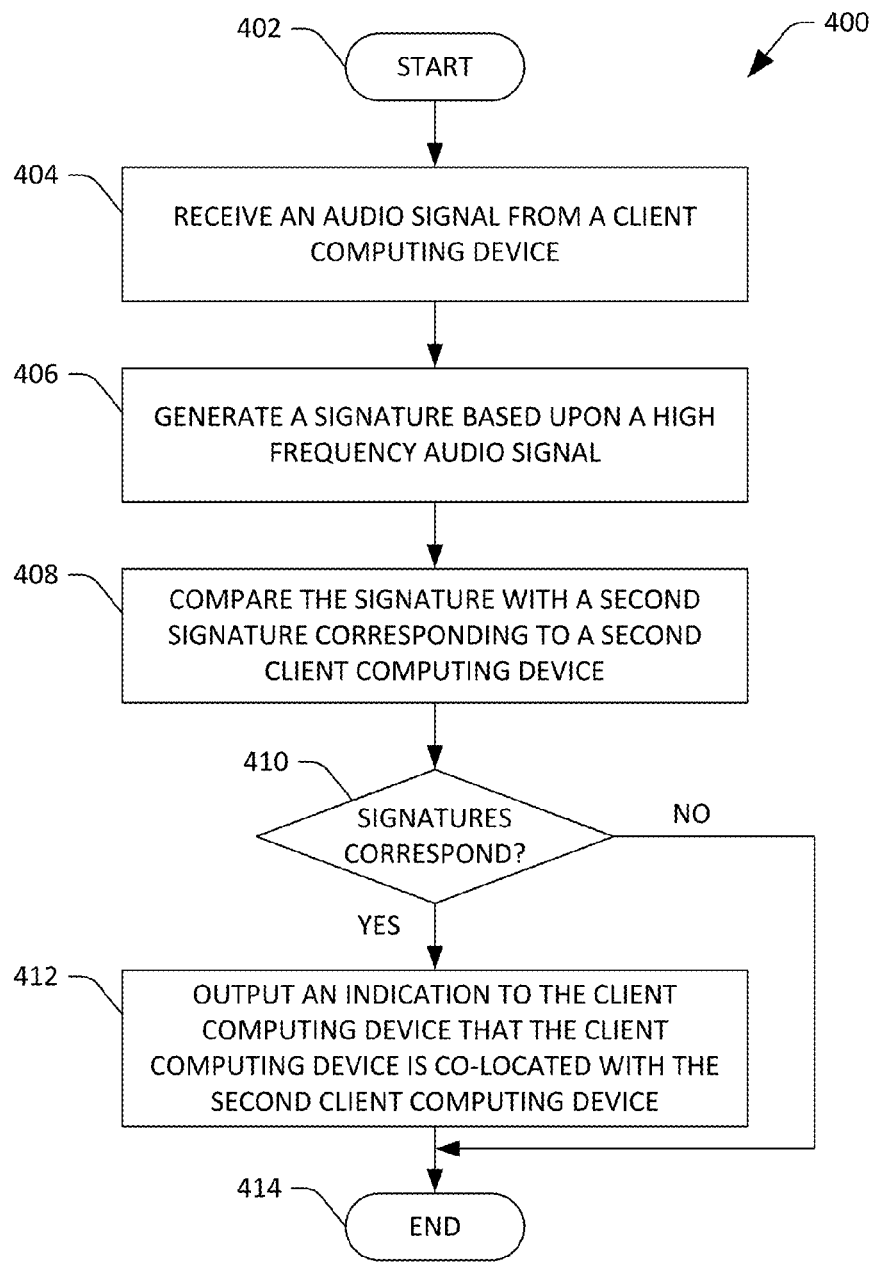
FIG. 4 is a flow diagram that illustrates an exemplary methodology for outputting an indication to a client computing device that informs the client computing device that it is co-located with another client computing device.

Now referring to FIG. 4, an exemplary methodology 400 that facilitates outputting an indication to a client computing device that the client computing device is co-located with a second client computing device in a room is illustrated. In an example, the methodology 400 may be executed on at least one server in a data center. The methodology 400 starts at 402, and at 404 an audio signal is received from a client computing device. The audio signal can be or include a high frequency audio signal, with frequencies, for example, inaudible to human ears. Further, the audio signal received at 404 may be compressed. At 406, a signature is generated based upon the high-frequency signal. The signature may be a hash generated by execution of a hash algorithm over the high-frequency audio signal.

At 408, the signature generated at 406 is compared with a second signature corresponding to a second client computing device. For example, the second signature can be generated based upon an audio signal captured by the second client computing device, wherein the first signature and second signature are generated proximate in time. For instance, the first signature can have a first timestamp assigned thereto and the second signature can have a second timestamp assigned thereto, wherein the first timestamp and the second timestamp are within a predefined threshold time from one another.

At 410, a determination is made as to whether the signatures correspond. For example, this determination can be made based upon whether the two signatures are included together in a cluster. In another example, this determination can be made based upon whether a distance value between the two signatures is below a predefined threshold. In yet another example, Fast Fourier Transforms (FFTs) of signatures can be compared with one another, and if the transforms are sufficiently similar, the signatures can be deemed to correspond. If the signatures are found to correspond at 410, then at 412 an indication is output to the client computing device (and optionally the second client computing device) that the client computing devices co-located with the second client computing device. Subsequent to act 412, or if it is determined at 410 that the signatures do not correspond, the methodology 400 completes at 414.

Figure 5:
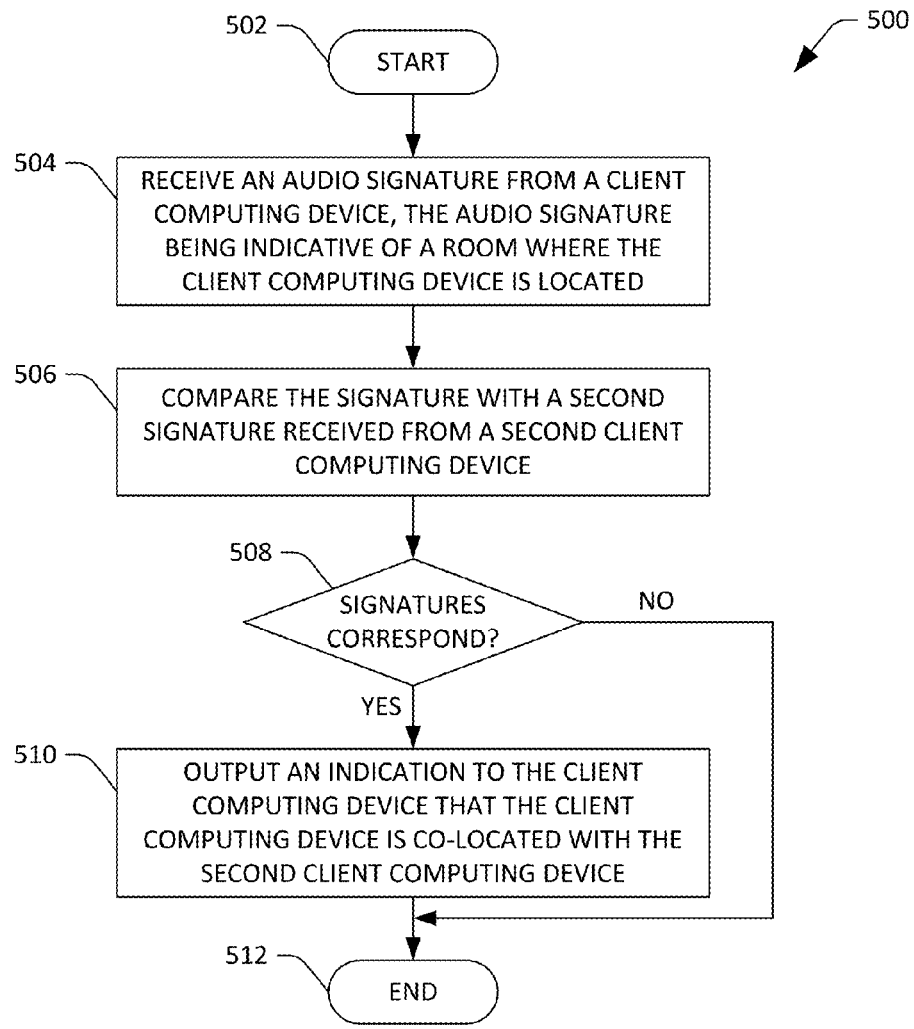
FIG. 5 is a flow diagram that illustrates an exemplary methodology for outputting an indication to a client computing device that the client computing device is co-located in a room with a second client computing device.

Now referring to FIG. 5, an exemplary methodology 500 that facilitates outputting an indication that a client computing device is co-located with a second client computing device is illustrated. In an example, the methodology 500 can be executed by at least one server computing device in a data center. The methodology 500 starts at 502, and at 504 an audio signature from a client computing device is received, wherein the audio signature is indicative of a room in which the client computing device resides. It can thus be ascertained that in the methodology 500 the client computing device generates the signature.

At 506, the signature received at 504 is compared with a second signature received from a second client computing device. At 508, a determination is made regarding whether the signatures correspond (e.g., whether the signatures are sufficiently similar to one another). If the signatures correspond to one another, the methodology proceeds to 510, where an indication is output to the client computing device (and optionally the second client computing device) that the client computing device and the second client computing device are co-located in the same room. Subsequent to 510, or if it is found at 508 that the signatures do not correspond, the methodology 500 completes at 512.

Figure 6:
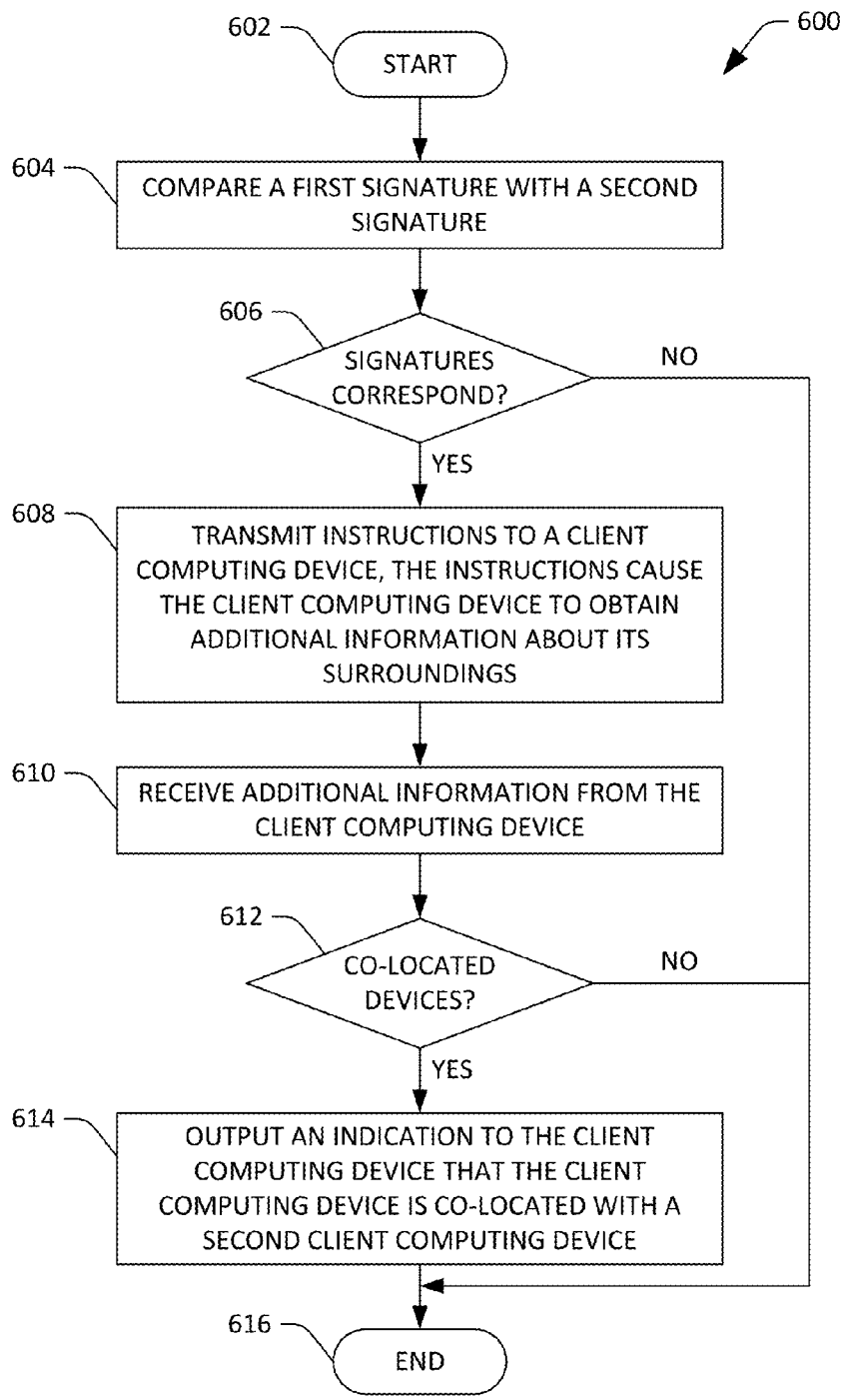
FIG. 6 is a flow diagram that illustrates an exemplary methodology for outputting an indication to a client computing device that the client computing device is co-located in a room with a second client computing device.

Now referring to FIG. 6, an exemplary methodology 600 that facilitates outputting an indication that a client computing device is co-located with a second client computing device is illustrated. In an example, the methodology 600 can be executed by at least one server computing device in a data center. The methodology 600 starts at 602, and at 604 a first signature is compared with a second signature. The first signature is based upon an audio signal captured by a first client computing device and the second signature is based upon an audio signal captured by a second client computing device.

At 606, a determination is made as to whether the signatures correspond. As indicated previously, the determination as to whether the signatures correspond can be based upon an amount of similarity between the signatures and times that indicate when the signatures were generated. If the signatures are found to correspond at 606, then at 608 instructions are transmitted to the first client computing device, wherein the instructions cause the first client computing device to obtain additional information about its surroundings. This additional information can include data acquired by a sensor on the client computing device (temperature, humidity, or the like), information captured by a speaker of the first client computing device (e.g., a high-frequency audio signal that has an identity of the second client computing device encoded therein), etc. At 610, the additional information is received from the client computing device.

Based upon the signatures being found to correspond at 606 and additional information from the first client computing device at 610, a determination is made at 612 as to whether the first client computing device is co-located with the second client computing device. If it is found at 612 that the client computing devices are co-located, then at 614 an indication is output to the first client computing device that the first client computing device is co-located with the second client computing device. Subsequent to act 614, or if at 606 it is found that the signatures fail to correspond or if at 612 it is found that the devices are not co-located, the methodology 600 completes at 616.

Figure 7:
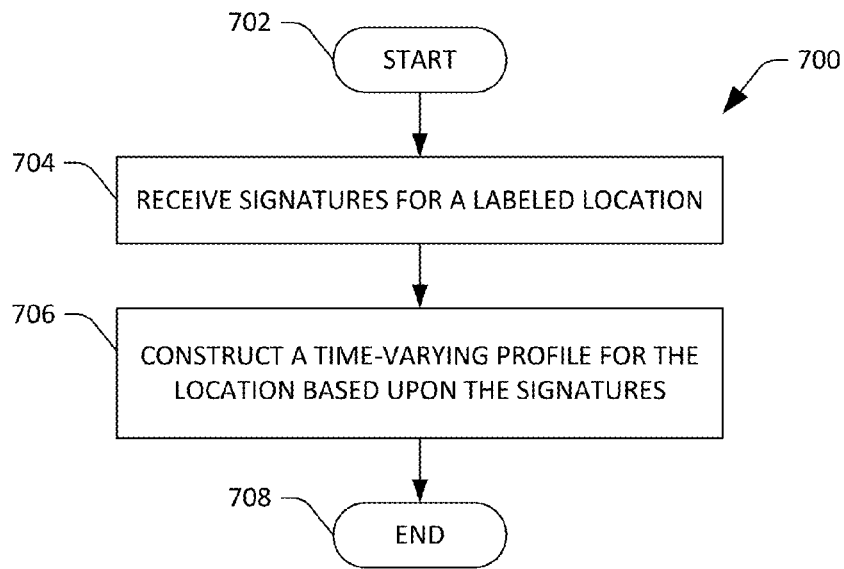
FIG. 7 is a flow diagram that illustrates an exemplary methodology for constructing a time varying profile for a room based upon audio-based signatures of the room.

Now referring to FIG. 7, an exemplary methodology 700 that facilitates constructing a time-varying profile of a room is illustrated. For example, the methodology 700 can be executed by at least one server computing device in a data center. The methodology 700 starts at 702, and at 704 audio-based signatures for a location are received. These audio-based signatures can be labeled as being based upon high-frequency portions of audio signals captured at the location (e.g., a particular room). Furthermore, the signatures can have timestamps corresponding thereto, which can indicate time of day, time of year, etc.

At 706, a time-varying profile for the location is constructed based upon the signatures received at 704. Accordingly, for example, when a signature generated based upon a high-frequency portion of an audio signal captured by a client computing device is received, the signature can be compared with the time-varying profile, and a determination can be made as to whether the high-frequency audio signal was captured in the profiled location based upon such comparison. The methodology 700 completes at 708.

Figure 8:
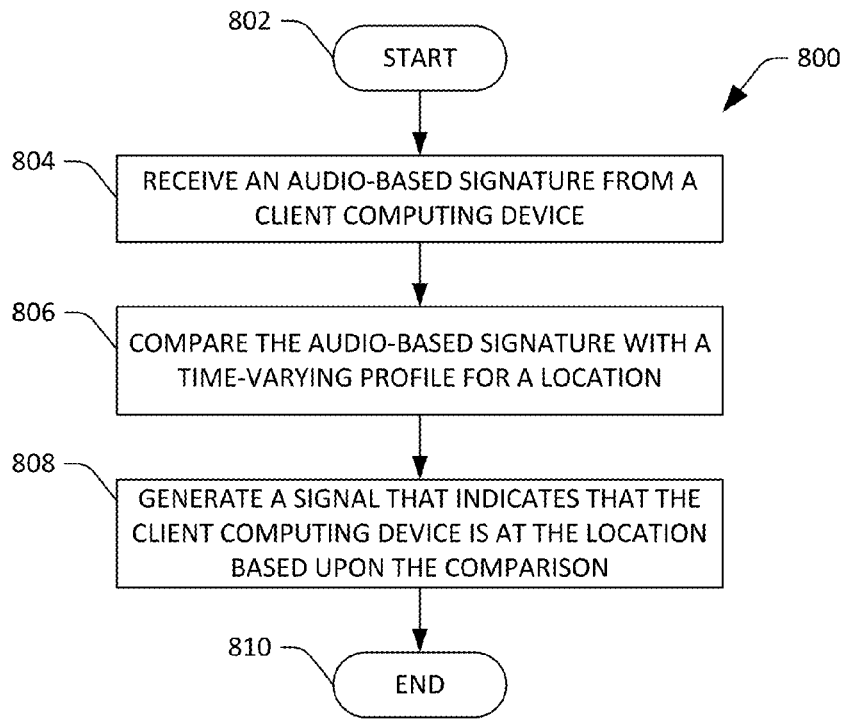
FIG. 8 is a flow diagram that illustrates an exemplary methodology for identifying that a client computing device is at a particular location.

Now turning to FIG. 8, an exemplary methodology 800 that facilitates determining that a client computing device is at a particular (indoor) location is illustrated. The methodology 800, in an example, can be executed by at least one server computing device in a data center. The methodology 800 starts at 802, and at 804 an audio-based signature is received from a client computing device. Alternatively, rather than the audio-based signature being received, a high-frequency portion of an audio signal captured by the client computing device can be received. At 806, the audio-based signature is compared with a time-varying profile for a location. For instance, the time-varying profile can be constructed in accordance with the methodology 700. At 808, a signal is generated that indicates that the client computing device is at the location based upon the comparison. For instance, the audio-based signature may correspond to the time-varying profile of the location. The methodology 800 completes at 810.

Figure 9:
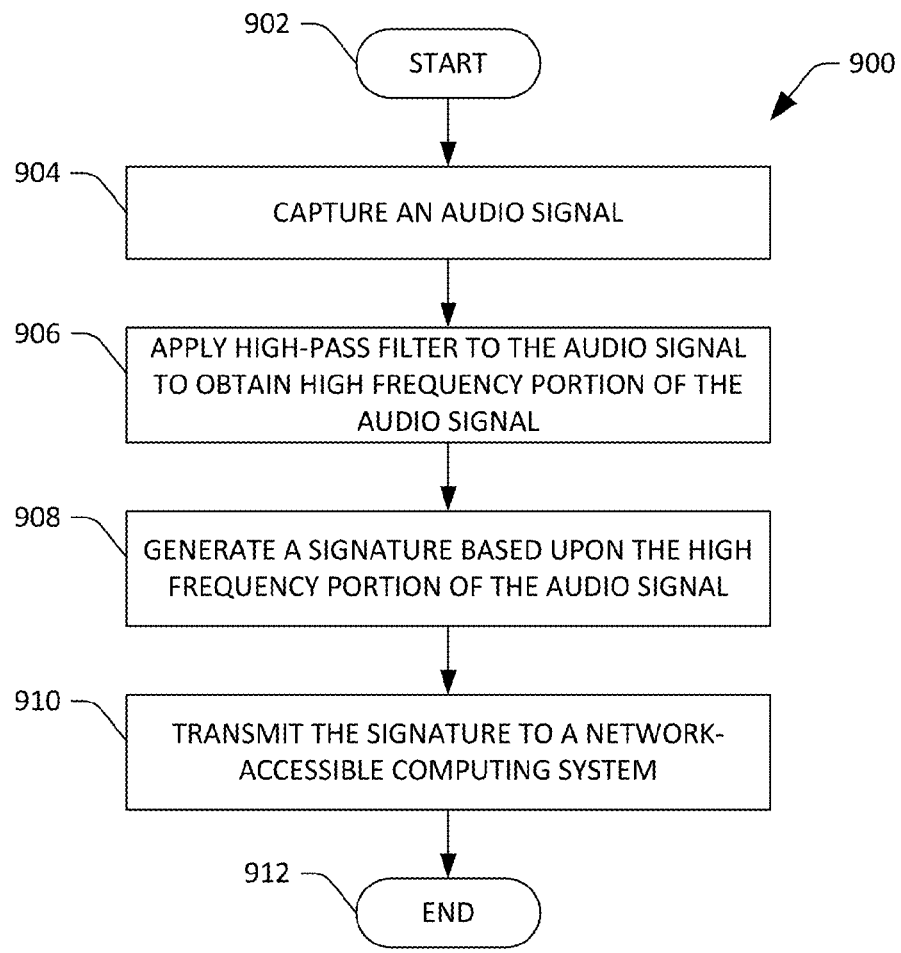
FIG. 9 is a flow diagram that illustrates an exemplary methodology for generating an audio-based signature of a room.

Now referring to FIG. 9, an exemplary methodology 900 for transmitting an audio-based signature corresponding to a location is illustrated. The methodology 900, for example, may be executed by a client computing device. The methodology 900 starts at 902, and at 904 an audio signal is captured. Specifically, a microphone can be caused to capture an audio signal of a particular time length. At 906, a high-pass filter is applied to the audio signal to obtain a high-frequency portion of the audio signal. The high-frequency portion may include frequencies, for example above 18 kHz, above 20 kHz, or the like. At 908, a signature is generated based upon the high-frequency portion of the audio signal. For example, a hash of the high-frequency portion of the audio signal can be generated and the signature can include such hash. The signature may also optionally include a timestamp that indicates when the audio signal was captured and an identity of the client computing device that captured the audio signal. At 910, the signature is transmitted to a network accessible computing system, which can compare the signature with other signatures generated based upon audio signals captured by other client computing devices. The methodology 900 completes at 912.

Figure 10:
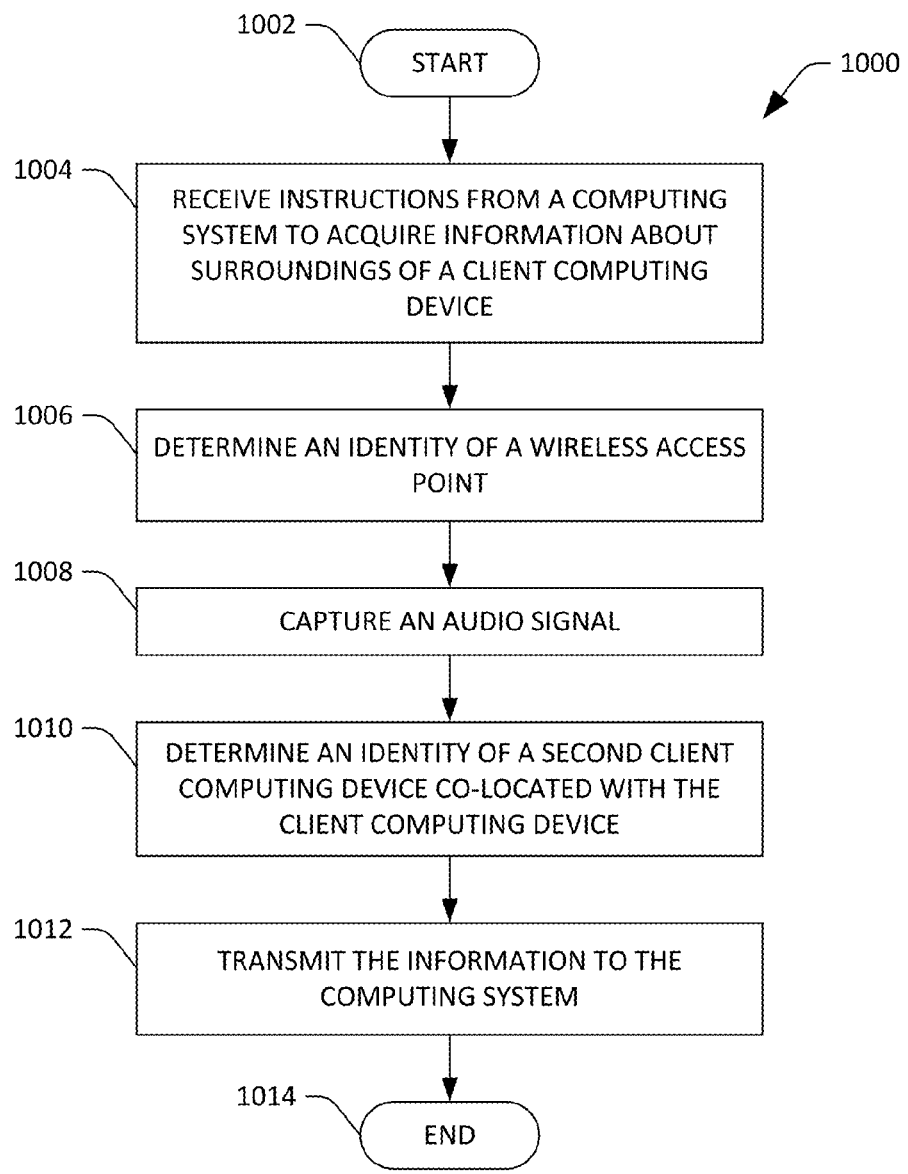
FIG. 10 is a flow diagram that illustrates an exemplary methodology for acquiring information about other computing devices in a room.

Now referring to FIG. 10, an exemplary methodology 1000 that facilitates provision of data about the surroundings of a client computing device to a computing system is illustrated. For instance, the methodology 1000 can be executed by a client computing device. The methodology 1000 starts at 1002, and at 1004 instructions are received from a computing system to acquire information about the surroundings of a client computing device. These instructions may cause sensors of the client computing device to capture observations, etc. At 1006, responsive to receiving the instructions at 1004, an identity of a wireless access point in communication with the client computing device can be acquired. This information can include a Wi-Fi SSID, a MAC address of a Bluetooth transmitter, etc.

At 1008, an audio signal is captured based upon the instructions received 1004. For example, the client computing device can listen (as a background task) for high-frequency audio signals that may be generated by other client computing devices, where such high-frequency audio signals may have an identity of another client computing device encoded therein. At 1010, an identity of a second client computing device co-located with the client computing device is identified based upon the captured audio signal. At 1012, this information (e.g., the identity of the wireless access point determined at 1006 and the identity of the second client computing device determined that 1010) can be transmitted to a computing system. The methodology 1000 completes at 1014.

Various examples are now set forth.

Example 1

A computing system comprising: a processor; and a memory that comprises a location system that is executed by the processor, the location system configured to: compute data that is indicative of a location of a client computing device based upon an audio-based signature of surroundings of the client computing device, the audio-based signature is based upon a high frequency portion of an audio signal captured by the client computing device; and provide the client computing device with the data that is indicative of the location of the client computing device.

Example 2

The computing system according to example 1, the location system comprises a signature generator component that is configured to generate the audio-based signature based upon the high frequency portion of the audio signal captured by the client computing device, the signature generator component configured to execute a hash over the high frequency portion of the audio signal.

Example 3

The computing system according to any of examples 1-2, the location system is configured to compute the data that is indicative of the location of the client computing device based upon a timestamp assigned to the audio signal.

Example 4

The computing system accordingly to any of examples 1-3, the location system comprises a comparer component that is configured to perform a comparison between the audio-based signature and an audio-based profile of a room, the location system configured to determine that the client computing device is located in the room based upon the comparison.

Example 5

The computing system according to example 4, the location system further comprises a profile constructor component that is configured to construct the audio-based profile of the room based upon audio-based signatures corresponding to computing devices labeled as being in the room when audio signals upon which the audio-based signatures were captured by the computing devices.

Example 6

The computing system according to example 5, the profile constructor component configured to update the audio-based profile based upon the audio-based signature responsive to the location system determining that the client computing device is located in the room.

Example 7

The computing system according to any of examples 1-6, wherein the data that is indicative of the location of the client computing device is a relative location, the location system configured to determine that the client computing device is co-located in a room with a second client computing device.

Example 8

The computing system according to example 7, the location system is configured to compute the data that is indicative of the location of the client computing device based upon a second audio-based signature, the second audio-based signature based upon a high frequency portion of a second audio signal captured by the second client computing device.

Example 9

The computing system according to example 8, the audio-based signature has a first timestamp assigned thereto, the second audio-based signature has a second timestamp assigned thereto, a difference between the first timestamp and the second timestamp being within a threshold.

Example 10

The computing system according to example 8, the location system comprises a transmitter component that is configured to transmit instructions to the client computing device, the instructions cause the client computing device to acquire additional information about the surroundings of the client computing device.

Example 11

The computing system according to example 10, the additional information comprises an identity of a wireless transceiver in communication with the client computing device and an identity of the second client computing device.

Example 12

The computing system according to example 10, the instructions cause the client computing device to drive a speaker to emit an inaudible audio signal with an identity of the client computing device encoded therein.

Example 13

The computing system according to any of examples 1-12, the high frequency portion of the audio signal being frequencies in the audio signal above at least 18 KHz.

Example 14

A method for determining that a first client computing device is co-located with a second client computing device, the method comprising: comparing a first signature with a second signature, the first signature based upon a high frequency portion of a first audio signal captured by the first client computing device, the second signature based upon a high frequency portion of a second audio signal captured by the second client computing device; determining that the first client computing device is co-located with the second client computing device based upon the comparing of the first signature with the second signature; and transmitting an indication to at least one of the first client computing device or the second client computing device that the first client computing device and the second client computing device are co-located.

Example 15

The method according to example 14, wherein the high frequency portion of the first audio signal excludes frequencies in the first audio signal below 18 KHz, and wherein the high frequency portion of the second audio signal excludes frequencies in the second audio signal below 18 KHz.

Example 16

The method according to any of examples 14-15, wherein determining that the first client computing device is co-located with the second client computing device comprises: receiving first data from the first client computing device that indicates that the first client computing device is in communication with an access point; receiving second data from the second client computing devices that indicates that the second client computing device is in communication with the access point; comparing the first data with the second data; and determining that the first client computing device is co-located with the second client computing device based upon the comparing of the first data with the second data.

Example 17

The method according to any of examples 14-16, wherein determining that the first client computing device is co-located with the second client computing device comprises: receiving data that identifies the second client computing device from the first client computing device; and determining that the first client computing device is co-located with the second client computing device based upon the data that identifies the second client computing device.

Example 18

The method according to example 17, further comprising: responsive to comparing the first signature with the second signature, transmitting instructions to the second client computing device, the instructions cause the second client computing device to output an audio signal, the data that identifies the second client computing device encoded in the audio signal; and receiving the data that identifies the second client computing device from the first client computing device responsive to transmitting the instructions.

Example 19

The method according to any of examples 14-18, further comprising constructing a time-varying profile of a room based upon the first signature and the second signature.

Example 20

A computer-readable storage medium comprising instructions that, when executed by a processor, cause the processor to perform acts comprising: determining that a first client computing device and a second client computing device are co-located in a room, the determining based upon a first audio signature of the room and a second audio signature of the room, the first audio signature of the room based upon a first audio signal captured by the first client computing device, the second audio signature of the room based upon a second audio signal captured by the second client computing device; and responsive to determining that the first client computing device and the second client computing device are co-located in the room, transmitting an instruction to at least one of the first client computing device or the second client computing device, the instruction causes content to be synchronously displayed on the first client computing device and the second client computing device.

Figure 11:
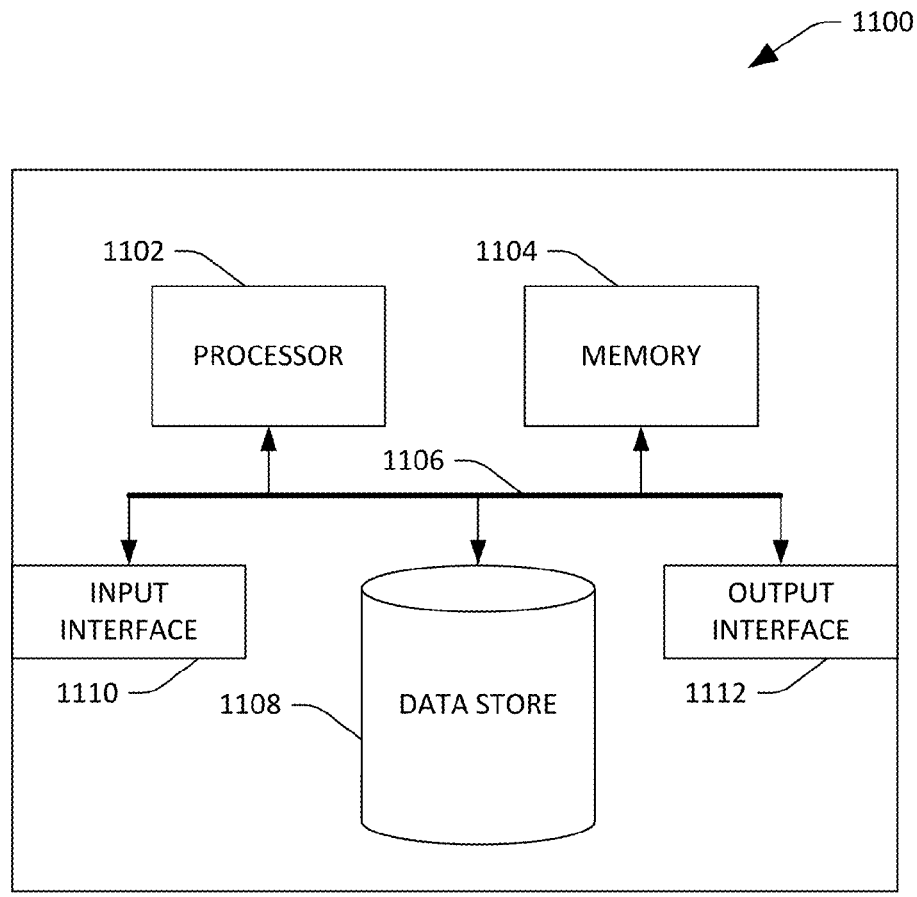
FIG. 11 is an exemplary computing system.

Referring now to FIG. 11, a high-level illustration of an exemplary computing device 1100 that can be used in accordance with the systems and methodologies disclosed herein is illustrated. For instance, the computing device 1100 may be used in a system that computes data that is indicative of a location of a client computing device. By way of another example, the computing device 1100 can be used in a system that is configured to compute an audio-based signature. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store profiles of locations, audio-based signatures, etc.

The computing device 1100 additionally includes a data store 1108 that is accessible by the processor 1102 by way of the system bus 1106. The data store 1108 may include executable instructions, identities of client computing devices, audio-based signatures, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
   at least one processor; and
   memory that comprises instructions that, when executed by the at least one processor, cause the at least one processor to perform acts comprising:
      comparing an audio-based signature of surroundings of a client computing device with an audio-based profile of a room, the audio-based signature is based upon a high frequency portion of an audio signal captured by the client computing device, the audio-based profile is based upon high frequency portions of other audio signals captured by other client computing devices when the other client computing devices were previously in the room, wherein the high frequency portion of the audio signal and the high frequency portions of the other audio signals being frequencies in the audio signal above 18 KHz;
      determining that the client computing device is located in the room based upon the comparing of the audio based signature with the audio-based profile of the room; and
      responsive to determining that the client computing device is located in the room, providing the client computing device with an indication that the client computing device is in the room.

2. The computing system of claim 1, the acts further comprising:
   generating the audio-based signature based upon the high frequency portion of the audio signal captured by the client computing device, wherein generating the audio-based signature comprises executing a hash over the high frequency portion of the audio signal.

3. The computing system of claim 1, wherein the audio-based signature is compared with the audio-based profile of the room-based upon a timestamp assigned to the audio signal captured by the client computing device.

4. The computing system of claim 1, the acts further comprising updating the audio-based profile of the room based upon the audio-based signature responsive to determining that the client computing device is located in the room.

5. The computing system of claim 1, the acts further comprising determining, based upon the audio-based signature, that the client computing device is co-located in the room with a second client computing device.

6. The computing system of claim 5, wherein determining that the client computing device is co-located in the room with the second client computing device comprises comparing a second audio-based signature with the audio-based profile of the room, wherein the second audio-based signature is based upon a high frequency portion of a second audio signal captured by the second client computing device.

7. The computing system of claim 6, wherein the audio-based signature has a first timestamp assigned thereto, the second audio-based signature has a second timestamp assigned thereto, and wherein determining that the client computing device is co-located in the room with the second client computing device comprises determining that a difference between the first timestamp and the second timestamp is within a threshold.

8. The computing system of claim 6, the acts further comprising transmitting instructions to the client computing device, the instructions cause the client computing device to acquire additional information about the surroundings of the client computing device.

9. The computing system of claim 8, the additional information comprises an identity of a wireless transceiver in communication with the client computing device and an identity of the second client computing device.

10. The computing system of claim 8, the instructions cause the client computing device to drive a speaker to emit an inaudible audio signal with an identity of the client computing device encoded therein.

11. A method for determining that a client computing device is located in a room, the method comprising:
    comparing a signature with a profile of the room, the signature based upon a high frequency portion of an audio signal captured by the client computing device, the profile of the room based upon high frequency portions of audio signals captured by other client computing devices that were previously in the room, wherein the high frequency portion of the audio signal excludes all frequencies in the audio signal below 18 KHz, and wherein the high frequency portions of the other audio signals exclude all frequencies in the other audio signals below 18 KHz;
    determining that the client computing device is located in the room based upon the comparing of the signature with the profile of the room; and
    transmitting an indication to the client computing device that the client computing device is located in the room.

12. The method of claim 11, further comprising:
    generating the signature based upon the high frequency portion of the audio signal captured by the client computing device, wherein generating the signature comprises generating a hash of the high frequency portion of the audio signal, wherein the signature is based upon the hash.

13. The method of claim 11, wherein the profile is time-varying, the method further comprising selecting the profile of the room from amongst several audio profiles of the room for comparing with the signature based upon a timestamp assigned to the signature.

14. The method of claim 11, further comprising:
    responsive to determining that the client computing device is located in the room, updating the profile of the room based upon the signature.

15. The method of claim 11, further comprising:
    determining that a second client computing device is co-located in the room with the client computing device based upon a second signature, the second signature is based upon a high frequency portion of a second audio signal captured by the second client computing device; and
    responsive to determining that the second client computing device is co-located in the room with the client computing device, transmitting an indication to client computing device that the second client computing device is co-located in the room with the client computing device.

16. The method of claim 15, wherein determining that the second client computing device is co-located in the room with the client computing device comprises comparing the signature with the second signature.

17. The method of claim 15, further comprising:
responsive to determining that the second client computing device is co-located in the room with the client computing device, transmitting an instruction to the client computing device that causes content to be simultaneously presented at the client computing device and the second client computing device.

18. Computer-readable memory comprising instructions that, when executed by a processor, cause the processor to perform acts comprising:
determining that a first client computing device and a second client computing device are co-located in a room, the determining based upon a first audio signature of the room and a second audio signature of the room, the first audio signature of the room based upon a first audio signal captured by the first client computing device, the second audio signature of the room based upon a second audio signal captured by the second client computing device; and
responsive to determining that the first client computing device and the second client computing device are co-located in the room, transmitting an instruction to at least one of the first client computing device or the second client computing device, the instruction causes content to be synchronously displayed on the first client computing device and the second client computing device.

19. The computer-readable memory of claim 18, wherein the first audio signature of the room is based upon a high frequency portion of the first audio signal, the high frequency portion excludes frequencies below 18 KHz.

20. The computer-readable memory of claim 19, the acts further comprising:
generating the first audio signature based upon the high frequency portion of the first audio signal, wherein generating the first audio signature comprises generating a hash of the high frequency portion of the first audio signal, wherein the first audio signature is based upon the hash.

* * * * *